US011078356B2

(12) United States Patent
Colombo et al.

(10) Patent No.: US 11,078,356 B2
(45) Date of Patent: Aug. 3, 2021

(54) POLYMER COMPOSITION COMPRISING AT LEAST ONE VINYL AROMATIC DIENE BLOCK COPOLYMER AND SPECIFIC AMOUNTS OF OIL

(71) Applicant: INEOS STYROLUTION GROUP GMBH, Frankfurt am Main (DE)

(72) Inventors: Andrea Colombo, Heidelberg (DE); Michael Hamilton, Brownstown, MI (US); Michiel Verswyvel, Brussels (BE); Eike Jahnke, Aubonne (CH); Bernd Elbert, Harsefeld (DE); Norbert Niessner, Friedelsheim (DE); Konrad Knoll, Mannheim (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 118 days.

(21) Appl. No.: 16/311,237

(22) PCT Filed: Jun. 26, 2017

(86) PCT No.: PCT/EP2017/065671
§ 371 (c)(1),
(2) Date: Dec. 19, 2018

(87) PCT Pub. No.: WO2018/001943
PCT Pub. Date: Jan. 4, 2011

(65) Prior Publication Data
US 2019/0233637 A1    Aug. 1, 2019

(30) Foreign Application Priority Data

Jun. 29, 2016 (EP) .................................. 16176777

(51) Int. Cl.
| | |
|---|---|
| *C08L 53/02* | (2006.01) |
| *C08L 91/00* | (2006.01) |
| *C08J 3/20* | (2006.01) |
| *C08J 5/18* | (2006.01) |
| *C08K 5/00* | (2006.01) |

(52) U.S. Cl.
CPC .............. *C08L 53/02* (2013.01); *C08J 3/201* (2013.01); *C08J 5/18* (2013.01); *C08L 91/00* (2013.01); *C08J 2353/02* (2013.01); *C08J 2491/00* (2013.01); *C08K 5/005* (2013.01); *C08L 2207/322* (2013.01)

(58) Field of Classification Search
CPC ... C08J 3/201; C08J 5/18; C08L 53/02; C08L 91/06; C08K 5/098

USPC ............................................................ 523/575
See application file for complete search history.

(56) References Cited

U.S. PATENT DOCUMENTS

| | | |
|---|---|---|
| 3,280,084 A | 10/1966 | Zelinksi et al. |
| 3,507,934 A | 4/1970 | Minor et al. |
| 3,637,554 A | 1/1972 | Childers et al. |
| 3,639,517 A | 2/1972 | Kitchen et al. |
| 3,939,112 A | 2/1976 | Needham |
| 3,985,830 A | 10/1976 | Fetters et al. |
| 4,086,298 A | 4/1978 | Fahrbach et al. |
| 4,091,053 A | 5/1978 | Kitchen |
| 4,122,134 A | 10/1978 | Miki et al. |
| 4,167,545 A | 9/1979 | Fahrbach et al. |
| 4,939,208 A | 7/1990 | Lanza et al. |
| 6,031,053 A | 2/2000 | Knoll et al. |
| 6,197,889 B1 | 3/2001 | Knoll et al. |
| 6,593,430 B1 | 7/2003 | Knoll et al. |
| 6,673,857 B1 * | 1/2004 | Knoll ..................... C08L 53/02 524/313 |
| 2006/0229411 A1 * | 10/2006 | Hatfield .................. C09J 153/02 525/88 |
| 2014/0011929 A1 | 1/2014 | Knoll et al. |

FOREIGN PATENT DOCUMENTS

| | | | |
|---|---|---|---|
| WO | 95/35335 A1 | 12/1995 | |
| WO | WO 1997 40079 | * | 4/1997 |
| WO | 00/58380 A1 | 10/2000 | |

OTHER PUBLICATIONS

Machine translation of WO 97/40079 (Year: 1997).*
S.D. Smith and A. Ashraf, "Synthesis and Characterization of PS-PI and PS-PBD Random Copolymers and Random-Block' Copolymers Via Anionic Polymerizations," Polymer Preprints 34(2):672-673 (1993).
S.D. Smith and A. Ashraf, "Styrene-Diene Random Copolymers, Blends and 'Random-Diblock' Copolymers," Polymer Preprints 35(2):466-467 (1994).

* cited by examiner

*Primary Examiner* — Doris L Lee
(74) *Attorney, Agent, or Firm* — J.A. Lindeman & Co., PLLC

(57) ABSTRACT

The present invention relates to a polymer composition comprising at least one block copolymer and a specific amount of at least one oil component. The block copolymer, which is the polymeric matrix of the inventive composition, is built up from at least one vinyl aromatic monomer $M_A$ and at least one conjugated diene monomer $M_B$, in particular the block copolymer is a styrene butadiene block copolymer (SBC).

12 Claims, No Drawings

POLYMER COMPOSITION COMPRISING AT LEAST ONE VINYL AROMATIC DIENE BLOCK COPOLYMER AND SPECIFIC AMOUNTS OF OIL

The present invention relates to a polymer composition comprising at least one block copolymer and a specific amount of at least one oil component. In particular the block copolymer, which is the polymeric matrix of the inventive composition, is built up from at least one vinyl aromatic monomer $M_A$ and at least one conjugated diene monomer $M_B$, in particular the block copolymer is a styrene butadiene block copolymer (SBC).

Further, the present invention is directed to moulded parts made from the inventive polymer composition and to a process for producing the inventive polymer composition.

Block copolymers of vinyl aromatics (e.g. styrene) and conjugated dienes (e.g. butadiene), in particular styrene butadiene block copolymers (SBC), are known for many years and are useful for a variety of purposes. For example it is known to combine polystyrene with SBC copolymers in order to achieve an impact resistant modified polystyrene. Block copolymers of styrene and butadiene are described for example in WO 2000/58380, WO 1995/35335 and U.S. Pat. No. 4,939,208.

Block copolymers of vinyl aromatics and conjugated dienes are copolymers comprising a plurality of polymer segments (polymer blocks) which are arranged in series or otherwise linked and have a more or less uniform composition. Depending on the structure and content of diene monomers, they may have overall at a certain temperature elastomeric properties or rigid, non-elastomeric properties. As a whole they either exhibit elastomeric behaviour similar to a polydiene and are for example used as rubbers (styrene butadiene SB rubbers), or they behave as transparent, impact-resistant styrene polymers. For such block copolymers those blocks determine the elastomeric behavior are referred to as the soft phase and the rigid blocks (in particular a pure polystyrene block) are referred to as the hard phase.

In particular, the present invention relates to usually transparent block copolymers of vinyl aromatics and dienes, which can be processed by a purely thermoplastic method and having elastomeric behaviour, so called thermoplastic elastomers based on styrene (S-TPE). Such block copolymers are normally prepared via anionic polymerization which leads to living polymers (anionic living polymerization). Typically, block copolymers are obtained by carrying out polymerization until a monomer stock is virtually exhausted and then changing the monomer or monomers.

This process can be repeated several times. Linear block copolymers or star block copolymers can be obtained by reaction of the living polymer with monofunctional or polyfunctional reactants. Linear block copolymers are described for example in U.S. Pat. Nos. 3,507,934 and 4,122,134. Star block copolymers are disclosed for example in U.S. Pat. Nos. 4,086,298; 4,167,545 and 3,639,517.

Generally, polymerization of styrene and butadiene in the presence of tetrahydrofuran gives butadiene-styrene copolymer blocks with some degree of random character. However, typically the addition of tetrahydrofuran also sharply increases the relative proportion of 1,2 linkages in the polydiene (also referred to as 1,2-vinyl content). A high 1,2-vinyl content, however, impairs the thermal stability of the block copolymers and increases the glass transition temperature. Random copolymerization of styrene and butadiene in cyclohexane in the presence of soluble potassium salts, e.g. potassium 2,3-dimethyl-3-pentanolate and potassium 3-ethyl-3-pentanolate, is described for example by S. D. Smith in Polymer Preprints 34 (2), 672 (1993) and 35 (2), 466 (1994).

The U.S. Pat. No. 6,197,889 describes thermoplastic rubbery elastic block copolymers (thermoplastic elastomers) and a polymerization process for their production, wherein the copolymers are useful for injection moulding and extrusion.

Examples of commercially styrene butadiene copolymers (SBC) are known under the K-Resin® trademark (Chevron Phillips Chemical Co., The Woodlands, Tex.) and trade names Styroflex® and Styrolux® of INEOS Styrolution.

It is further known in the state of the art to add an oil component, such as mineral oil, e.g. white oil or liquid paraffin; to SBC compositions in order to improve flow properties (for example U.S. Pat. No. 3,939,112). Typically, it is desired to obtain SBC compositions having excellent elastomeric behaviour and particular mechanical and improved thermal properties, and at the same time have a Shore A hardness being in the range of typical plasticized PVC, which typically is Shore A hardness of about 85 or less. Typically, up to about 2% of weight of a liquid paraffin is necessary to achieve a Shore A hardness of approximately 85. On the other hand it is known that miscibility of low molecular weight additives decrease with increasing molecular weight of the polymer. Often extruded sheet and tubes made of SBC polymer compositions according to the state of the art collapse and lack sufficient melt strength for manufacturing of extruded parts. In particular this is a problem when the molecular weight $M_w$ of the SBC polymer is below 100,000 g/mol, and an oil component, such as a liquid paraffin oil, is present in an amount of up to 2% by weight.

In particular the inventive polymer compositions and extruded parts thereof should exhibit high melt strength and high elasticity (especially no yield point/yield stress) and at the same time low Shore A hardness. The polymer compositions should show good results in sheet and foil extrusion. The optical properties, such as transparency, should be maintained. It should be possible to blend the polymer compositions with other polymers, such as polystyrene or mono vinylarene acrylate copolymers (e.g. SMMA).

It was one object of the present invention to provide improved SBC polymer compositions, in particular compositions of high molecular weight SBC having a molecular weight above 100,000 g/mol, which do not show the above mentioned disadvantages and which comply with the above mentioned requirements.

It was surprisingly found that a high molecular weight SBC polymer with a molecular weight of 100,000 g/mol or more could be melt blended with up to 10% by weight of a liquid paraffin, while retaining the extrudability into sheet or tubing.

The present invention is directed to a polymer composition comprising (preferably consisting of):
90 to 98% by weight, based on the total polymer composition;
at least one block copolymer P, having one of the following formulas (I) to (III):

$$(A-B/A)_n\text{-}A \qquad (I),$$

$$X\text{—}[(B/A\text{-}A)_n]_{m+1} \qquad (II),$$

$$Y\text{—}[(B/A\text{-}A)_n]_{m+1} \qquad (III),$$

wherein the abbreviations and indices have the following meaning:

A is a vinyl aromatic block forming a hard phase, which is composed of at least one vinyl aromatic monomer $M_A$, B/A is a diene block forming a soft phase, which is composed of at least one conjugated diene monomer $M_B$ and at least one vinyl aromatic monomer $M_A$, X is the radical of an m+1-functional initiator, Y is the radical of an m+1-functional coupling agent, n is a natural number from 1 to 10, preferably 1 to 3, and m is a natural number from 1 to 10, preferably 1 to 3, more preferably 1;

2 to 10% by weight, preferably 2.5 to 5% by weight, based on the total polymer composition, at least one oil component C; and 0 to 5% by weight, one or more further components E; wherein the at least one block copolymer P comprises (preferably consists of) 40 to 75% by weight, based on the block copolymer P, of the at least one vinyl aromatic monomer $M_A$ and 25 to 60% by weight, based on the block copolymer P, of the at least one conjugated diene monomer $M_B$;

the glass transition temperature/s $T_g$ of the vinyl aromatic block/s A is/are above 25° C. and the glass transition temperature/s $T_g$ of the diene block/s B/A is/are below 25° C., the proportion of the vinyl aromatic block/s A forming the hard phase is from 5 to 40% by volume, based on the total volume of block copolymer P;

the relative amount of 1,2 linkages in the diene block B/A, based on the sum of 1,2- and 1,4-cis/trans-linkages, is less than or equal to 15%;

and the weight average molecular weight $M_w$ of the block copolymer P is equal to or greater than 100,000 g/mol.

The wording "is composed of monomers" or "comprises monomers" in connection with a polymer or a copolymer block is understand in such way that the polymer or block of copolymer is formed by polymerization of said monomers.

The glass transition temperature can be determined by a method commonly known to a skilled person, such as Differential Scanning calorimetry (DSC), Thermal Mechanical Analysis (TMA) or Dynamic Mechanical Analysis (DMA). In particular the glass transition temperature $T_g$ is measured by Differential Scanning calorimetry (DSC), preferably using a defined thermal history, e.g. heating up the sample within the DSC pan under controlled conditions (in particular with defined heating rate and a defined gas, such as nitrogen), cooling down under controlled conditions and heating up again ($2^{nd}$ heating curve). It is not absolutely necessary to use the $2^{nd}$ heating curve, glass transitions can often be determined with sufficient accuracy in the $1^{st}$ heating curve of a DSC run.

The amount of 1,2 linkages and 1,4 linkages in the B/A blocks can in particular determined using FT-IR spectroscopy.

The weight average molecular weight $M_W$ and the number average molecular weight $M_n$ can for example determined by gel permeation chromatography (GPC). Typically GPC is calibrated using anionically polymerized styrene samples. Typically, anionic polymerization results in a Poisson's distribution of molecular weights, hence $M_w$ and $M_n$ of anionically polymerized blocks are often differing only slightly. Larger differences between $M_w$ and $M_n$ might be observed several times in case anionically polymerized blocks are coupled, e.g. by epoxidized soybean oil or epoxidized linseed oil. In the following, if not indicated otherwise, the molecular weight means the weight average molecular weight $M_w$.

Block Copolymer P

In particular the block copolymer P is an elastomeric block copolymer built up from at least one block A formed from vinyl aromatic monomer units and forming the hard phase and at least one elastomeric block B/A formed from vinyl aromatic monomers and also from diene monomers and forming a soft phase.

The block B/A of conjugated diene and vinyl aromatic units preferably has a random structure, wherein the relative amount of 1,2 linkages in the diene block B/A of the block copolymer P, based on the sum of 1,2- and 1,4-cis/trans-linkages, is always being below or equal to 15%, preferably below 15%. Preferably the relative amount of 1,2 linkages is less than or equal to 12%. In particular the relative amount of 1,2 linkages in the diene block B/A is from 9 to 15%, more preferably from 10 to 12%.

As a statistical average, the structure may be homogeneous or inhomogeneous along the chain. Typically, such random blocks B/A of block copolymer P may be obtained by copolymerization of the vinyl aromatic monomer and the diene monomer in the presence of an randomizer, in particular a potassium salt in a nonpolar solvent. Preferably the diene block B/A of the block copolymer P may be prepared by random copolymerization of styrene and butadiene in cyclohexane in the presence of soluble potassium salts as described by S. D. Smith, A. Ashraf et al. in Polymer Preprints 34(2) (1993), 672, and 35(2) (1994), 466. Further preferred block copolymers P and their preparation are described in U.S. Pat. No. 6,197,889.

The phase volume ratio of vinyl aromatic block/s A to diene block/s (B/A) being chosen so that the proportion of the hard phase in the total block copolymer is from 5 to 40% by volume, based on the total volume of block copolymer P.

The amounts by volume of the hard and the soft phase in the solid is of decisive importance for the mechanical properties of the block copolymer P. Preferably, the amount by volume of the soft phase $(B/A)_n$ composed of diene and vinyl aromatic monomer is from 60 to 95% by weight, preferably 70 to 90% by weight, particularly preferably 80 to 90% by volume, based on the total block copolymer P. The vinyl aromatic block/s A forming the hard phase, accordingly have an amount by volume from 5 to 40% by volume, preferably 10 to 30% by volume, particularly preferably 10 to 20% by volume, based on the total block copolymer P. Typically, the amount by volume of the two phases can be measured by high-contrast electron microscopy or solid-state NMR spectroscopy. Further, the amount of the vinyl aromatic blocks can be determined by precipitation and weighing after osmium degradation of the polydiene fraction. The phase ratio of the block copolymer P can also be calculated from the amounts of monomers used if complete polymerization is permitted in each case.

A preferred block copolymer P have one of the following formulas (I)' to (III)'

A-(B/A)-A    (I)'

X—[—(B/A)-A]₂    (II)'

Y—[—(B/A)-A]₂    (III)"

wherein the abbreviations have the meaning given above.

In a particular preferred embodiment the at least one block copolymer is a linear styrene-butadiene triblock copolymer of the structure

A-(B/A)-A    (I)'.

Preferably the block copolymer P has a soft phase B/A which is divided into p segments (B/A)$_p$ having each changing monomer composition. A particularly preferred block copolymer P is one whose soft phase B/A is divided into two or more segments, preferably the soft phase B/A of block copolymer P has one of the following formulas:

$$(B/A)^1\text{-}(B/A)^2; \qquad (IV\_1),$$

$$(B/A)^1\text{-}(B/A)^2\text{-}(B/A)^1; \qquad (IV\_2),$$

$$(B/A)^1\text{-}(B/A)^2\text{-}(B/A)^3; \qquad (IV\_3).$$

wherein the blocks (B/A)$^1$, (B/A)$^2$ and (B/A)$^3$ have different compositions, in particular different ratios of vinyl aromatic monomer M$_A$/diene monomer M$_B$.

Preferably said ratio in the individual blocks (B/A) changes in such way that a composition gradient (B/A)$_{p1}$< (B/A)$_{p2}$<(B/A)$_{p3}$ occurs in each segment. The glass transition temperature T$_g$ of each segment is less than 25° C. Such block copolymers which having p repeating segments (part-blocks) with changing monomer composition can be formed by addition of p portions of the monomers, where p is an integer from 2 to 10. The addition of the monomers may serve, for example, to control the heat balance in the reaction mixture.

A block copolymer P which has a plurality of blocks (B/A) and/or A, each having a different molecular weight per molecule, is likewise preferred.

In particular the vinyl aromatic monomer M$_A$ is a mono vinyl aromatic monomer (also referred to as mono vinylarene). Preferably, the vinyl aromatic monomer M$_A$ is at least one monomer selected from organic compounds containing a single carbon-carbon double bond, at least one aromatic moiety, and in particular a total of 8 to 18 carbon atoms, preferably 8 to 12 carbon atoms. Preferably the aromatic moiety is a mono cyclic moiety, more preferably mono cyclic moiety having a 6 membered aromatic ring. In particular, the at least one vinyl aromatic monomer M$_A$ is a mono vinyl mono cyclic arene monomer having 8 to 12 carbon atoms.

In particular the vinyl aromatic monomer M$_A$ is at least one monomer selected from styrene or substituted styrenes. Preferably one or more substituted styrenes according to the following formula (V)

wherein
R is C$_1$-C$_8$-alkyl or hydrogen;
R$^1$ is C$_1$-C$_8$-alkyl or hydrogen,
with the provision that not both of R and R$^1$ are hydrogen, and
q is 1, 2 or 3,
can be used alone or in combination with unsubstituted styrene as vinyl aromatic monomer M$_A$.

Preferably the vinyl aromatic monomer M$_A$ is at least one monomer selected from styrene, a (alpha)-methylstyrene, 2-methylstyrene, 3-methylstyrene, 4-methylstyrene, 2-ethylstyrene, 3-ethylstyrene, 4-ethylstyrene, 4-n-propyl-styrene, 4-t-butylstyrene, 2,4-dimethylstyrene, 4-cyclohexylstyrene, 4-decylstyrene, 2-ethyl-4-benzylstyrene, 1,1-diphenylethylene, 4-(4-phenyl-n-butyl) styrene, 1-vinylnaphthalene, and 2-vinylnaphthalene. More preferably the vinyl aromatic monomer M$_A$ is at least one monomer selected from styrene, α-methylstyrene, methylstyrene and 1,1-diphenylethylene.

In particular the diene monomer M$_B$ is a conjugated diene monomer. Preferably, the diene monomer M$_B$ is at least one monomer selected from organic compounds containing at least two, preferably exactly two, conjugated carbon-carbon double bonds and in particular a total of 4 to 12 carbon atoms, preferably 4 to 8 carbon atoms. Examples of such suitable conjugated dienes include 1,3-butadiene, 2-methyl-1,3-butadiene (isoprene), 2-ethyl-1,3-butadiene, 2,3-dimethyl-1,3-butadiene, 1,3-pentadiene, 3-butyl-1,3-octadiene, and mixtures thereof. In one embodiment, the conjugated diene is 1,3-butadiene and/or 2-methyl-1,3-butadiene (isoprene), more preferably 1,3-butadiene. In particular the diene monomer M$_B$ is 1,3-butadiene or a mixture of 1,3-butadiene and at least one further diene monomer mentioned above.

Preferably, the invention is directed to a polymer composition described above, wherein the vinyl aromatic monomer M$_A$ is at least one monomer, selected from the group consisting of styrene, α (alpha)-methylstyrene, vinyltoluene and 1,1-diphenylethylene, and the conjugated diene monomer M$_B$ is at least one monomer selected from the group consisting of butadiene and isoprene. More preferably the vinyl aromatic monomer M$_A$ is at least one monomer, selected from the group consisting of styrene and α (alpha)-methylstyrene, and the conjugated diene monomer M$_B$ is butadiene.

The block copolymer P comprises (preferably is composed of):
40 to 75% by weight, preferably 60 to 70% by weight, based on the block copolymer P, of the at least one vinyl aromatic monomer M$_A$, preferably selected from styrene, α-methylstyrene, vinyltoluene and 1,1-diphenylethylene, and
25 to 60% by weight, preferably 30 to 40% by weight, based on the block copolymer P, of the at least one vinyl aromatic monomer M$_A$, preferably selected from 1,3-butadiene and 2-methyl-1,3-butadiene.

In a particular preferred embodiment the block copolymer P comprises (preferably is composed of):
60 to 70% by weight, based on the block copolymer P, styrene and/or α-methylstyrene, as monomer M$_A$; and
30 to 40% by weight, based on the block copolymer P, 3-butadiene and/or 2-methyl-1,3-butadiene as monomer M$_B$.

Preferably the weight ratio of the diene block/s B/A, based on the total block copolymer P, is/are in the range of 50 to 80% by weight. For example the diene block/s B/A is/are composed of 40 to 75% by weight of styrene and 25 to 60% by weight of butadiene, preferably of 40 to 60% by weight of styrene and 40 to 60% by weight of butadiene.

In particular the molecular weight of the diene block/s B/A is/are in the range of 2,000 to 250,000 g/mol, preferably from 5,000 to 250,000 g/mol, also preferably from 20,000 to 250,000 g/mol.

In particular the molecular weight of the vinyl aromatic block/s A is/are in the range of 1,000 to 200,000 g/mol, preferably from 3,000 to 80,000 g/mol, also preferably from 5,000 to 100,000 g/mol.

Preferably a block copolymer P is used wherein the molecular weight of the vinyl aromatic block/s A is/are in the range of 5,000 to 100,000 g/mol; and the molecular weight of the diene block/s B/A is/are in the range of 20,000 to 250,000 g/mol, preferably from According to the invention the weight average molecular weight $M_w$ of the block copolymer P is equal to or greater than 100,000 g/mol. Preferably the weight average molecular weight $M_w$ of the block copolymer P is in the range of 100,000 to 400,000 g/mol, preferably 120,000 to 300,000 g/mol.

In a preferred embodiment the glass transition temperature/s $T_g$ of the vinyl aromatic block/s A is/are above 50° C. and the glass transition temperature/s $T_g$ of the diene block/s B/A is/are below 20° C., more preferably below 5° C.

Preferably the block copolymer P is obtained by a process which comprises the step of forming the block copolymer by sequential anionic polymerization, where at least the polymerization step of the at least one diene block B/A takes place in the presence of a potassium salt as randomizer. More preferably the block copolymer P is prepared by anionic polymerization in a non-polar solvent, initiation is effected by means of organometallic compounds, e.g. butyl lithium as described in U.S. Pat. No. 6,197,889 (column 5 and 6, and examples).

The coupling centre Y is formed by the reaction of the living anionic chain ends with a bifunctional or polyfunctional coupling agent. The coupling centre X is formed by the anionic polymerization stating with a bifunctional or polyfunctional initiator X. Examples of such compounds for forming the coupling centres X or Y are described in U.S. Pat. Nos. 3,985,830, 3,280,084, 3,637,554 and 4,091,053. Preferably a bi- to penta-functional coupling agent or initiator, more preferably a bi-functional initiator X or coupling agent Y is used, i.e. m is 1 to 4, preferably 1. For example, epoxidized glycerides, such as epoxidized linseed oil or soybean oil, are preferably used as m+1-functionalized initiator X or m+1-functionalized coupling agent Y; divinylbenzene is also suitable. Dichlorodialkylsilanes, dialdehydes, such as terephthalaldehyde, and esters, such as ethyl formate or ethyl benzoate, are particularly suitable for the dimerization.

For example suitable block copolymers P are selected from commercial available SBS polymers, e.g. polymers of series Styroflex®, Styrolux® and Styroclear® (from Ineos Styrolution).

Oil Component C

The inventive polymer composition comprises 2 to 10% by weight, preferably 2.5 to 5% by weight, more preferably 3 to 4% by weight, based on the total polymer composition, at least one oil component C.

In particular the at least one oil component C is a low molecular weight oil component having an average molecular weight in the range of 100 to 1,000 g/mol, preferably from 250 to 500 g/mol.

Preferably, the at least one oil component C is selected from liquid oils (which mean that the oil is in liquid state at room temperature). Preferably, the oil component C is composed of one or more oils which are in the liquid state at a temperature in the range of 20 to 25° C., preferably at a temperature of about 23° C.

In particular the oil component C has a viscosity of 10 to 5,000 mPa*s, preferably from 50 to 1,000 mPa*s, measured at a temperature in the range of 20 to 25° C., preferably at 23° C.

Preferably the at least oil component C is at least one oil selected from mineral oils, vegetable oils (also referred to as plant oils) and silicon oils.

In terms of the present invention mineral oils refers to liquid products from refining crude oil, typically having a density in the range of 0.7 to 0.9 g/cm3. Mineral oil obtained from crude oil refinement is typically a mixture of paraffinic oils (saturated linear or branched alkanes), naphthenic oil (saturated cyclic alkanes) and aromatic oils (based on aromatic hydrocarbons). Mineral oil is registered in CAS register under CAS-8012-95-1.

In terms of the present invention the term mineral oil includes also further processed products, e.g. such referred to as white oil (higher refined mineral oil consisting mainly of alkanes and cycloalkanes) or liquid paraffin (further purified mineral oils). Liquid paraffin is listed in CAS register under CAS-8012-95-1. Typically liquid paraffin exhibits a density of 0.81-0.89 g/cm³. Liquid paraffin consists mainly of acyclic saturated alkanes, in particular linear and iso alkanes. Typically based on the average length of alkane there are different types of liquid paraffin, e.g. paraffinum perliquidum, having a viscosity in the range of 25 to 80 mPa·s, or paraffinum subliquidum, having a viscosity in the range of 110 to 230 mPas, measured at a temperature in the range of 20 to 25° C., preferably at 23° C.

In terms of the present invention vegetable oils refers to triglycerides extracted from plants, in particular from plant seeds, wherein the oil is liquid at room temperature. The term vegetable oil also includes derivatives of vegetable oils, such as hydrogenated vegetable oils (hydrogenation of carbon-carbon double bonds). Examples for vegetable oils are palm oil, coconut oil, canola oil, soybean oil, sunflower oil rapeseed oil, peanut oil, palm oil, olive oil, corn oil.

In terms of the present invention silicon oils refers to a polymerized siloxane having organic side chains which can in particular described by the formula $[R^aR^bSiO]_o$ with $R^a$ and $R^b$ are organic radicals, such as alkyl radicals. Preferably the silicon oil component is selected from polydimethylsiloxanes which may be linear or branched. For example the silicon oil can be a polydimethylsiloxane $(CH_3)_2Si—[O—Si(CH_3)_2-]_sO-Si(CH_3)_2$, with s=integer number>1, preferably s=1 to 5,000. Typically, the kinematic viscosity of the silicon oil component D is the range of 100 mm²/s to 1,000,000 mm²/s, preferably in the range of 500 to 100,000 mm²/s.

In a preferred embodiment the oil component C is one or more mineral oil, more particular a liquid mineral oil, selected from white oil and paraffin oil, e.g. paraffinum perliquidum or paraffinum subliquidum. Preferably the oil component C comprises or preferably mainly consists of at least one paraffin oil consisting mainly of alkane $C_nH_{2n+2}$ with n=12-32, preferably 14-26.

In a further preferred embodiment the oil component C is at least one paraffin oil having a viscosity in the range of 20 to 300 mPas, preferably 30 to 200 mPas, measured at a temperature in the range of 20 to 25° C., preferably at 23° C.

An example for a commercial available oil component C, which can be used according to the present invention is Mineral Oil DAB 70.

Further Component E

Besides components P and C, the polymer composition may comprise commonly known additives or auxiliaries as optional component E. The additives and auxiliaries may either improve the properties of the moulded parts produced from the polymer compositions and blends thereof, or else be suitable for facilitating the preparation of the polymer composition and improving its processability.

The optional at least one further component E is preferably used in an amount from 0 to 30% by weight, preferably from 0.01 to 20% by weight, particularly preferably from 0.5 to 10% by weight, most preferably from 0.1 to 1.5% by weight, based on the total weight of the polymer composition.

The polymer composition may comprise for example one or more further component E selected from stabilizers; antioxidants; anti-blocking agents (such as erucic acid amide, stearic acid amide, tri calcium phosphate); mould release agents; extenders; dyes; pigments; flame-retardants; fillers; reinforcing agents (e.g. glass fibres); antistatic agents (for example block copolymers made from ethylene oxide-propylene oxide), blowing agents, bactericides, fungicides Preferably the polymer composition comprises at least one further component E selected from stabilizers; antioxidants; anti-blocking agents, such as erucic acid amide, stearic acid amide; mould release agents; extenders; dyes; and pigments. For example stabilizers, preferably light stabilizers, selected from the group consisting of the hindered amines (HALS stabilizers), can be used as further component E. Further, commonly known stabilizers, in particular for SBC compositions, are antioxidants based on organic compounds including phosphorus, thio and/or phenolic groups, e.g. Irgafos® (from BASF SE), Irganox® (from BASF SE) and Sumilizer® (from Sumitomo Chemicals).

According to a preferred embodiment the inventive polymer composition comprises (preferably consists of):
  94.9 to 97.49% by weight, based on the total polymer composition; of the at least one block copolymer P,
  2.5 to 5% by weight, based on the total polymer composition, of the at least one oil component C,
  and 0.01 to 5% by weight, preferably 0.01 to 1% by weight, based on the total polymer composition, one or more further components E, preferably selected from stabilizers, antioxidants; anti-blocking agents and mould release agents.

Typically, the block copolymer P is polymerized in a plurality of stages and, in the case of monofunctional initiation, is started, for example, with the preparation of the hard block A. One part of the monomers is initially taken in the reactor and the polymerization is initiated by adding the initiator. In order to achieve a defined chain structure which can be calculated from the monomer and initiator dose, it is advisable to carry out the process up to a high conversion (more than 99%) before the second monomer addition. A suitable polymerization process is described in U.S. Pat. No. 6,197,889.

Furthermore, the present invention relates to a moulded part comprising (or made from) the inventive polymer composition as described above. The moulded part can be used in various fields of applications of transparent, in particular highly transparent polymer articles. For examples the moulded parts can be a food container, display racks, crisper trays, and components of toys.

In particular the moulded part is selected from extruded sheets, extruded multilayer sheets, extruded tubings, multi-lumen tubings, drip chamber parts, food packagings, beakers, plates and labels. Preferably, the moulded part is selected from extruded, injection moulded, thermoformed or blown finished articles for applications in medicine.

The inventive polymer compositions are thermoplastic compositions and can be used to produce formed parts by any commonly known method, e.g. injection moulding, extrusion, blow moulding. For example the formed parts can be selected from plates, semi-manufactured products, films, fibres and foams. In particular said moulded parts can for example used in the automobile sector, e.g. in bodywork construction for vehicles, for the interior of automobiles, and as medical devices. The mouldings of the invention can be employed, in particular, in the construction of ships, aircraft or trains, in particular as lining parts, undertray components, dashboards, shell construction for seats, bulkheads. Furthermore, nonautomotive applications of the mouldings of the invention are also conceivable, e.g. formwork plates, lining elements, supporting shells and casing components.

The inventive polymer composition as described above can be used for the production of household items, electronic components, household equipment, garden equipment, medical-technology equipment, motor-vehicle components, and bodywork parts. In particular the polymer composition as described above can be used for the production of food container. In particular the polymer composition as described above can be used for the production of highly transparent objects (e.g. moulding, foil). Typically, the production can be carried out by any commonly known method, e.g. injection moulding, extrusion, blow moulding. More preferably the inventive polymer composition as described above can be used for the production of stretch films, infusion tubes and other extruded, injection moulded, thermoformed or blown finished articles which have to have high transparency and toughness, in particular for applications in medicine.

In another aspect the invention relates to the production of the inventive polymer composition as described above, wherein the at least one block copolymer P is mixed with the at least one oil component C, and optionally further components E. Typically, adequate mixing of the components can be achieved by mechanical mixing, preferably by melt extrusion, e.g. using a single screw or twin screw extruder. Operation of an extruder to achieve this end is within the purview of a person skilled in the art. Typically, the barrel temperature of the extruder may be in the range of from 200 to 250° C., preferably from 215 to 235° C. The components of the polymer composition may be individually fed to the extruder. Alternatively, they may be mixed together and then fed to the extruder, or mixed together and then extruded, and then optionally chopped into pellets.

Particular preferred embodiments are also described in the claims. The present invention is further illustrated by the following experiments.

EXAMPLE I: PREPARATION OF THE POLYMER COMPOSITIONS

Polymer compositions based on styrene butadiene block copolymers (SBC) were prepared using the following components:

P linear styrene butadiene triblock copolymer with a melt volume rate (200° C., 5 kg, determined according to ISO 1133) of 13 cm$^3$/10 min, a butadiene content of 34.4% by weight and a molecular weight $M_w$ in the range of 155,200 to 185,900 g/mol C oil component, paraffin oil DAB 70

E further components E:
  E1: Zinc stearate,
  E2: Sumilizer™ GS, from Sumitomo Chemicals, phenolic antioxidant stabilizer, CAS 123968-25-2
  E3: Irganox® 1010 from BASF SE, phenolic antioxidant stabilizer, CAS 6683-19-8
  E4: Irgafos® 168 from BASF SE, phosphite processing stabilizer (tris(2,4-ditert-butylphenyl)phosphite The components were mixed by extrusion using the following parameters:
Extruder type: ZSK 30
Extruder screw diameter: 30 mm
Throughput: 5-10 kg/h
Melt temperature: 210-250° C.
Die temperature: 240° C.

The polymer compositions according to examples 1 to 8 are summarized in the following table 1. The molecular weight $M_w$ of the polymer component P is given in table 2.

TABLE 1

Polymer Compositions

| Example | 1 | 2 | 3 | 4 | 5 | 6 | 7 | 8 |
|---|---|---|---|---|---|---|---|---|
| P | up to 100% | up to 100% | up to 100% | up to 100% | up to 100% | up to 100% | up to 100% | up to 100% |
| C [% by weight] | 0 | 2.9 | 3.0 | 3.2 | 3.3 | 3.1 | 3.0 | 2.7 |
| E1 [ppm] | 1,203 | 1,201 | 1,189 | 1,252 | 1,100 | 1,010 | 1,128 | 1,035 |
| E2 [ppm] | 1,857 | 2,101 | 2,068 | 2,043 | 2,038 | 1,922 | 1,919 | 1,908 |
| E3 [ppm] | 1,922 | 2,048 | 1,995 | 1,999 | 2,089 | 1,972 | 1,950 | 1,951 |
| E4 [ppm] | 2,392 | 1,869 | 1,363 | 2,030 | 1,756 | 1,955 | 1,846 | 1,644 |

EXAMPLE II: PHYSICAL DATA OF THE POLYMER COMPOSITIONS

Analytical, optical and mechanical data of the examples 1 to 8, e.g. measured on injection-moulded test specimen, are summarized in the following Table 2.

The test methods are described in Example III. Surprisingly, it is shown that the inventive SBC compositions of examples 2-5 do not show increased melt volume flow rate (MVR), despite containing up to 3% mineral oil. The polymer components of examples have similar molecular weight compared to example No. 1. Lower MVR however is important for good extrusion properties. Furthermore, the inventive samples 2-5 show higher bulk density and improved yield stress in comparison to the control sample without oil, at generally good clarity of >70% and low Haze of <30%. This result is surprising, because in the light of the state of the art, typically the addition of mineral oil addition to SBC compositions results in a higher melt flow. In case of extrusion applications, a lower MVR is important to allow higher melt strength after the extrusion die.

TABLE 2

Properties of polymer compositions

| | 1 | 2 Low MVR, | 3 Low MVR, | 4 High MVR, | 5 High MVR, | 6 | 7 | 8 |
|---|---|---|---|---|---|---|---|---|
| $M_w$ [g/mol] | 170,000 | 185,500 | 185,900 | 177,200 | 167,800 | 156,400 | 155,200 | 158,700 |
| MVR [g/10 min] | 13.4 | 8.4 | 7.1 | 11.1 | 11.3 | 17.3 | 16.8 | 17.7 |
| Vicat softening point [° C.] | 47.7 | 38.9 | 38.7 | 39.4 | 38.2 | 39.4 | 39.2 | 39.9 |
| Bulk density [g/l] | 588 | 608 | 595 | 599 | 617 | 618 | 619 | 618 |
| Yield stress [MPa] | 4.0 | Type D | Type D | Type D | Type D | Type D | Type D | Type D |
| E modulus [MPa] | 81.25 | 84.2 | 97.4 | 83.6 | 46.8 | 49.5 | 50.6 | 36.1 |
| Shore A compression | — | 78 | 78 | 80 | 77 | 82 | 81 | 70 |
| Shore D compression | — | 24 | 25 | 26 | 25 | 27 | 26 | 25 |
| YI | 11.2 | 13.4 | 14.4 | 13.0 | 12.5 | 15.0 | 17.0 | 15.1 |
| Transmittance [%] | 81.8 | 79.9 | 81.9 | 81.7 | 81.2 | 81.8 | 82.1 | 81.4 |
| Haze [%] | 15.4 | 27.2 | 21.3 | 17.8 | 22.7 | 13.6 | 13.1 | 24.4 |
| Clarity [%] | 96.4 | 68.8 | 70.3 | 71.1 | 63.0 | 88.0 | 90.8 | 74.8 |

Yield stress "Type D" means that no yield point on the stress-strain curve can be determined.

EXAMPLE III: TEST METHODS

The following test methods are used for characterization of the SBC compositions (see data of Table 2): The weight average molecular weights $M_W$ of the SBC block copolymers were analysed using gel permeation chromatography (GPC) on polystyrene gel columns (Polymer Labs, mixed B type) with monodisperse polystyrene standards at room temperature using tetrahydrofuran as eluent.

The Melt Volume Flow Rate (MVR) was been determined using the polymer granulate according to ISO 1133-1:2011-12 at 200° C. with a load of 5 kg.

The polymer compositions according to Examples 1 to 8 as described above were processed to standard test specimens. For mechanical measurements 2 mm thick sheets were produced by compression moulding (200° C., 3 min) and test specimens were produced. The tests were performed as described in the following Table 3:

TABLE 3

Test methods

| Test | Description |
|---|---|
| Melt Flow Rate | ISO 1133-1: 2011-12 |
| Vicat Softening Point | load 1 kg, temperature 25° C. |
| Bulk density | ISO 1183-1 |
| Tensile Properties | ASTM D-638 |
| Shore hardness A and D | DIN ISO 7619-1 compression 200° C., annealed 50° C. for 1 hour |
| Yellowness Index YI | ISO 17223 |
| Transmittance; Haze | ISO 13468 |

Typically, the Shore A scale is used for soft rubbers while the Shore D scale is used for tough rubbers. The depth of indentation or penetration of a steel rod is typically measured on a scale of 0 to 100. The steel rod is either configured as a defined frustum cone (Shore A) or a defined needle pin (Shore D).

The properties clarity, haze and transmittance were determined using haze-gard plus (BYK Gardner GmbH) (illuminate CIE-C). The clarity was determined on basis of ASTM D-1044.

The invention claimed is:

1. A polymer composition consisting of:
   94.9 to 97.49% by weight, based on the total polymer composition:
   at least one block copolymer P, having one of the following formulas (I) to (III):

   $(A-B/A)_n-A$        (I),

   $X-[(B/A-A)_n]_{m+1}$        (II),

   $Y-[(B/A-A)_n]_{m+1}$        (III), wherein the abbreviations and indices have the following meaning:
   A is a vinyl aromatic block forming a hard phase, which is composed of at least one vinyl aromatic monomer $M_A$,
   B/A is a diene block forming a soft phase, which is composed of at least one conjugated diene monomer $M_B$ and at least one vinyl aromatic monomer $M_A$,
   X is the radical of an m+1-functional initiator,
   Y is the radical of an m+1-functional coupling agent,
   n is a natural number from 1 to 10, and
   m is a natural number from 1 to 10;
   2.5 to 5% by weight, based on the total polymer composition,
   at least one oil component C, wherein the oil component is one or more paraffin oil; and
   0.01 to 1% by weight, based on the total polymer composition, one or more further components E;
   wherein:
   the at least one block copolymer P comprises 40 to 75% by weight, based on the block copolymer P, of the at least one vinyl aromatic monomer $M_A$ and 25 to 60% by weight, based on the block copolymer P, of the at least one conjugated diene monomer $M_B$;
   the glass transition temperature's $T_g$ of the vinyl aromatic block's A is/are above 25° C. and the glass transition temperature's $T_g$ of the diene block's B/A is/are below 25° C.,
   the proportion of the vinyl aromatic block's forming the hard phase is from 5 to 40% by volume, based on the total volume of block copolymer P;
   the relative amount of 1,2 linkages in the diene block B/A, based on the sum of 1,2- and 1,4-cis/trans-linkages, is less than or equal to 15%; and
   the weight average molecular weight $M_w$ of the block copolymer P is in the range of 120,000 to 300,000 g/mol.

2. The polymer composition according to claim 1, wherein the vinyl aromatic monomer $M_A$ is at least one monomer selected from the group consisting of styrene, α-methylstyrene, vinyltoluene, and 1,1-diphenylethylene, and the conjugated diene monomer $M_B$ is at least one monomer selected from the group consisting of butadiene and isoprene.

3. The polymer composition according to claim 1, wherein the vinyl aromatic monomer $M_A$ is at least one monomer selected from the group consisting of styrene and α-methylstyrene, and the conjugated diene monomer $M_B$ is butadiene.

4. The polymer composition according to claim 1, wherein the molecular weight of the vinyl aromatic block's A is/are in the range of 5,000 to 100,000 g/mol; and the molecular weight of the diene block's B/A is/are in the range of 20,000 to 250,000 g/mol.

5. The polymer composition according to claim 1, wherein the glass transition temperature $T_g$ of the vinyl aromatic block's A is/are above 50° C.; and the glass transition temperature $T_g$ of the diene block's B/A is/are below 5° C.

6. The polymer composition according to claim 1, wherein the relative amount of 1,2 linkages in the diene block B/A of the block copolymer P, based on the sum of 1,2- and 1,4-cis/trans-linkages, is less than or equal to 12%.

7. The polymer composition according to claim 1, wherein the oil component C is at least one paraffin oil having a viscosity in the range of 20 to 300 m Pas, measured at a temperature in the range of 20 to 25° C.

8. The polymer composition according to claim 1, wherein the block copolymer P is obtained by a process which comprises the step of forming the block copolymer by sequential anionic polymerization, where at least the polymerization step of the at least one block B/A takes place in the presence of a potassium salt as randomizer.

9. A moulded part made from the polymer composition according to claim 1.

10. The moulded part according to claim 9, wherein the moulded part is selected from extruded sheets, extruded multilayer sheets, extruded tubings, multilumen tubings, drip chamber parts, food packagings, beakers, plates, and labels.

11. A process for the production of the polymer composition according to claim 1, wherein the at least one block copolymer P is mixed with the at least one oil component C, and optionally further components E.

12. The process according to claim 11, wherein the components are mixed by melt extrusion.

* * * * *